United States Patent
Noh et al.

(10) Patent No.: US 11,775,988 B2
(45) Date of Patent: *Oct. 3, 2023

(54) SYSTEMS AND METHODS TO FACILITATE RESOLUTION OF WORK ITEMS IN A FRAUD RESOLUTION WORKFLOW

(71) Applicant: PATREON, INC., San Francisco, CA (US)

(72) Inventors: Jeffrey Noh, San Francisco, CA (US); Dmytro Malieiev, Pleasanton, CA (US)

(73) Assignee: Patreon, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/156,054

(22) Filed: Jan. 18, 2023

(65) Prior Publication Data
US 2023/0153834 A1 May 18, 2023

Related U.S. Application Data

(63) Continuation of application No. 16/827,426, filed on Mar. 23, 2020, now Pat. No. 11,605,095.

(51) Int. Cl.
*G06Q 30/00* (2023.01)
*G06Q 10/06* (2023.01)
(Continued)

(52) U.S. Cl.
CPC ..... *G06Q 30/0185* (2013.01); *G06Q 10/0633* (2013.01); *G06Q 10/0635* (2013.01);
(Continued)

(58) Field of Classification Search
CPC ....... G06Q 30/0185; G06Q 10/063114; G06Q 10/063116; G06Q 10/0633; G06Q 10/0635
See application file for complete search history.

(56) References Cited

U.S. PATENT DOCUMENTS 7,263,506 B2   8/2007   Lee
8,065,233 B2   11/2011  Lee
(Continued)

FOREIGN PATENT DOCUMENTS

CN   108182248 A  *  6/2018
CN   108182248 A      6/2018
(Continued)

OTHER PUBLICATIONS

Mohammed Alzomai, "An Experimental Investigation of the Usability of Transaction Authorization in Online Banking Security Systems", 2007, Australian Information Security Conference (ASCS) 2008, pp. 1-10. (Year: 2007).*

(Continued)

*Primary Examiner* — Tan D Nguyen
(74) *Attorney, Agent, or Firm* — ESPLIN & ASSOCIATES, PC

(57) ABSTRACT

Systems and methods are provided for facilitating resolution of work items within a fraud resolution workflow. Exemplary implementations may: manage fraud workflow information, the fraud workflow information specifying a queue of work items, individual work items representing individual fraud resolution tasks associated with individual content creators of a membership platform flagged for fraud, individual work items being associated with work items records; effectuate presentation of a user interface for displaying individual work item pages through which the users access the individual work items for resolution, wherein the user interface facilitates access to individual ones of the work item records of the individual work items associated with the individual work item pages; and/or perform other operations.

20 Claims, 7 Drawing Sheets

(51) Int. Cl.
  G06Q 30/018      (2023.01)
  G06Q 10/0633     (2023.01)
  G06Q 10/0631     (2023.01)
  G06Q 10/0635     (2023.01)
(52) U.S. Cl.
  CPC ............... *G06Q 10/063114* (2013.01); *G06Q 10/063116* (2013.01)

(56) References Cited

U.S. PATENT DOCUMENTS

| | | | |
|---|---|---|---|
| 8,826,280 B1 | 9/2014 | Robertson | |
| 9,965,946 B2 | 5/2018 | Al-Ali | |
| 10,204,374 B1 | 2/2019 | Holan | |
| 10,445,667 B2 | 10/2019 | Hamilton | |
| 10,672,260 B2 | 6/2020 | Al-Ali | |
| 10,713,603 B2 | 7/2020 | Hamilton | |
| 10,897,479 B1 | 1/2021 | Chen | |
| 10,999,440 B1 | 5/2021 | Archer | |
| 11,010,695 B2 | 5/2021 | Hamilton | |
| 11,233,873 B2 | 1/2022 | Liu | |
| 11,269,755 B2 | 3/2022 | Bates | |
| 11,379,855 B1 | 7/2022 | Anderson | |
| 11,403,569 B2 | 8/2022 | Hamilton | |
| 11,514,379 B2 | 11/2022 | Adrian | |
| 2002/0099649 A1 | 7/2002 | Lee | |
| 2003/0125961 A1* | 7/2003 | Janda | G07F 17/0042 705/307 |
| 2004/0128182 A1 | 7/2004 | Pepoon | |
| 2005/0065836 A1 | 3/2005 | Tanaka | |
| 2006/0271381 A1 | 11/2006 | Pui | |
| 2007/0094064 A1 | 4/2007 | Yankovich | |
| 2007/0299953 A1 | 12/2007 | Walker | |
| 2008/0046334 A1 | 2/2008 | Lee | |
| 2008/0270171 A1 | 10/2008 | Price | |
| 2009/0089122 A1 | 4/2009 | Koukis | |
| 2009/0125608 A1 | 5/2009 | Werth | |
| 2009/0216560 A1* | 8/2009 | Siegel | G16H 20/10 705/2 |
| 2010/0299158 A1* | 11/2010 | Siegel | G16H 20/10 705/2 |
| 2012/0004948 A1 | 1/2012 | Taintor | |
| 2012/0226579 A1* | 9/2012 | Ha | G06Q 30/02 705/26.35 |
| 2014/0012755 A1 | 1/2014 | Walker | |
| 2014/0146961 A1 | 5/2014 | Ristock | |
| 2014/0266790 A1 | 9/2014 | Al-Ali | |
| 2014/0278646 A1 | 9/2014 | Adrian | |
| 2014/0278968 A1 | 9/2014 | Strompolos | |
| 2014/0330621 A1 | 11/2014 | Nichols | |
| 2015/0106145 A1 | 4/2015 | Hamilton | |
| 2015/0127398 A1 | 5/2015 | Hoen, IV | |
| 2016/0085744 A1* | 3/2016 | Dunn | G06F 40/30 704/9 |
| 2016/0300214 A1* | 10/2016 | Chaffin | G06Q 20/22 |
| 2016/0335731 A1 | 11/2016 | Hall | |
| 2017/0094361 A1 | 3/2017 | Thomas | |
| 2017/0323394 A1 | 11/2017 | Campione | |
| 2018/0225960 A1 | 8/2018 | Al-Ali | |
| 2018/0332138 A1 | 11/2018 | Liu | |
| 2019/0130413 A1 | 5/2019 | Nelson | |
| 2019/0286540 A1 | 9/2019 | Bates | |
| 2019/0295013 A1 | 9/2019 | Lhota | |
| 2019/0306272 A1 | 10/2019 | Taylor | |
| 2020/0012992 A1 | 1/2020 | Chan | |
| 2020/0042912 A1 | 2/2020 | Hamilton | |
| 2020/0097865 A1 | 3/2020 | Hamilton | |
| 2020/0219114 A1 | 7/2020 | Wood | |
| 2020/0299642 A1 | 9/2020 | Li | |
| 2020/0394903 A1 | 12/2020 | Al-Ali | |
| 2021/0205710 A1 | 7/2021 | Sim | |

FOREIGN PATENT DOCUMENTS

| | | | |
|---|---|---|---|
| CN | 108460687 A | * | 8/2018 |
| CN | 108460687 A | | 8/2018 |
| WO | 0054199 A2 | | 9/2000 |
| WO | WO-0054199 A2 | * | 9/2000 |
| WO | WO-2009102861 A1 | * | 8/2009 |
| WO | 2018190846 A1 | | 10/2018 |
| WO | WO-2018190846 A1 | * | 10/2018 |

OTHER PUBLICATIONS

P. Kardasis, "Expressing and Organizing Business Rules," 2003, Information and Software Technology 46 (2004), pp. 701-718. (Year: 2004).*

Jiao Sun, "FraudVis: Understanding Unsupervised Fraud Detection Algorithms," 2018, IEEE, pp. 170-174. (Year: 2018).*

Andrew Kinai, "Multi-factor authentication for users of non-internet based applications of blockchain-based platforms," 2020, IEEE International Conference on Blockchain, pp. 525-531. (Year: 2020).*

"Marketing Roadmaps: From BOTS to BOUGHT: The "crisis" in influencer marketing"; Weblog post. Newstex Global Business Blogs, Newstex. Jun. 29, 2018. https://dialog.proquest.com/professional/docview/2061540515?accountid=131444 (Year:2018).

"Xconomy: Hybra's Kickstarter Backers File Complaints, Allege Fraud—and Wait"; Weblog post. Newstex Trade & Industry Blogs, Newstex. Apr. 27, 2016. (https://dialog.proquest.com/professional/docview/1784610373?accountid=131444 (Year: 2016).

Anton Riabov, Zhen Liu, Joel L. Wolf, Philip S. Yu, Li Zhang, Clustering Algorithms for Content-Based Publication—Subscription Systems, Jul. 31, 2001, IEEE Transactions on Engineering Management (Year: 2001) 10 pages.

Dedeu, Federico; "Influence or fraud?"; Bizcommunity.com Cape Town: SyndiGate Media Inc. (Oct. 26, 2018) (Year 2018).

Griffin, Zachary J.; "Crowdfunding: Fleecing the American Masses"; Journal of Law, Technology and the Internet4.2 375(36). Case Western Reserve University School of Law. (Jan. 2013-Mar. 2013) (Year: 2013).

Jerome Swartz, "Security systems for a mobile world", 2003, Technology in Society, pp. 5-25. (Year: 2003).

Oracle Universal Work Queue—Implementation Guide—Release 11i Oracle, Jul. 2001 (Year: 2001) 136 pages.

Oracle Universal Work Queue—User Guide—Release 11i Oracle, Aug. 2004 (Year: 2004) 106 pages.

Shiblee Sadik, "Research Issues in Outlier Detection for Data Streams," 2014, SIGKDD Explorations, vol. 15, Issue 1, p. 33-40. (Year: 2014).

TrackWise—User's Guide Sparta Systems, Inc., 2000 (Year: 2000) 179 pages.

* cited by examiner

SYSTEMS AND METHODS TO FACILITATE RESOLUTION OF WORK ITEMS IN A FRAUD RESOLUTION WORKFLOW

FIELD

The disclosure relates to systems and methods to facilitate resolution of work items within a fraud resolution workflow.

BACKGROUND

Different platforms can be utilized by entities seeking contributions from users to obtain a needed service(s) and/or resource(s). Some of these platforms facilitate raising resources (i.e., funds) from the user through monetary contributions or donations to support a project. Oftentimes, supporters of a project are given rewards or special perks, where the size and/or exclusivity of the rewards or special perks can depend on the amount contributed.

SUMMARY

A membership platform may be comprised of users including one or more of content creators, subscribers, and/or other users. Content creators may be users of the membership platform who offer content (also referred to as "benefit items") to subscribers in exchange for some consideration. A "benefit item" may refer to a good and/or service. A good may comprise a physical good and/or a digital good. In some implementations, subscribers may donate funds to a content creator such that the benefit item may be the altruism in supporting the content creator. Subscribers may be users of the membership platform who subscribe, through payment of a one-time or recurring (e.g., monthly) fee, to one or more content creators. A subscriber of an individual content creator may obtain access to benefit items offered through the membership platform by virtue of being a subscriber to the individual content creator. A subscriber of an individual content creator may obtain preferential access to benefit items offered through the membership platform by virtue of being a subscriber to the individual content creator. Preferential access may refer to subscriber-only access to benefit items and/or other content. Preferential access may refer to tiered levels of access to benefit items and/or other content. Different levels of access may offer different quantities, types, and/or combinations of benefit items. Different levels may correspond to different amounts of consideration paid by the given subscriber. In some implementations, other users of the membership platform may obtain limited access to benefit items. In some implementations, other users may be non-paying users and/or one-time visitors to the membership platform.

In a membership platform, monitoring for fraud is important. For example, content creators may create fraudulent accounts in order to scam subscribers out of money. Fake subscriber accounts may be made in order to fraudulently boost subscribership. Machine and/or human intervention may help mitigate issues of fraud. For example, machine learning and/or other machine intervention techniques may help assess and/or flag issues of fraud. Human agents may then review the flagged items to confirm or deny the fraudulent activity. In some instances, a result of an assessment may be that fraudulent activity was improperly flagged. However, absent stopping all fraud detection on that creator altogether, the activity may continue to be falsely flagged in the future, causing unnecessary work by fraud review agents.

One aspect of the present disclosure relates to a system configured to facilitate resolution of work items within a fraud resolution workflow. A user interface (UI) for fraud review provides access to various records, as well as the ability to assign immunities for fraud-related activity. Immunities may provide temporary holds on certain activity and/or information that would otherwise continue to flag a content creator fraud. Providing this and/or other functionality within a single UI allows for more efficient review.

The system may include one or more hardware processors configured by machine-readable instructions. Executing the machine-readable instructions may cause the one or more processors to facilitate resolution of work items within a fraud resolution workflow. The fraud resolution workflow may refer generally to the process of monitoring a membership platform, flagging items for potential fraud, designating the flagged items as work items, distributing the work items to users to resolve, obtaining a resolution, and/or other operations. The machine-readable instructions may include one or more computer program components. The computer components may include one or more of a fraud item component, a presentation component, an immunity component, and/or other computer components.

The fraud item component may be configured to manage fraud workflow information and/or other information. The fraud workflow information may specify a queue of work items. Individual work items may represent individual fraud resolution tasks associated with individual content creators of a membership platform flagged for fraud. Individual work items may be associated with one or more work items records.

The presentation component may be configured to effectuate presentation of a user interface for displaying individual work item pages through which the users access the individual work items for resolution. The user interface may facilitate access to individual ones of the work item records of the individual work items associated with the individual work item pages. The individual users may work to resolve the work items in their user-specific queues.

The immunity component may be configured to manage immunity information and/or other information. The immunity information may define one or more restrictions placed on the individual work items for future flagging for the fraud. By way of non-limiting illustration, the immunity information may define a restriction placed on a given work item resolved with a non-fraud indication. The restriction may restrict the given work item from being flagged for the fraud in the future, subject to restriction criteria.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Some entities may seek to obtain funds through subscriptions. Such entities may utilize online membership platforms that allow consumers to sign up for ongoing payments in exchange for rewards or other membership benefits. Entities seeking funding may be content creators, for example, artists, musicians, educators, etc. Content creators may create content, which may refer to one or more of information, experience, products, and/or other content provided to an audience or end-user, whether it be digital, analog, virtual, and/or other form. For example, types of content may include but is not limited to video content, podcasts, photographic art, webcomics, do-it-yourself crafts, digital music, performance art, and/or other types of content. Content creators may utilize membership platforms that allow consumers to become subscribers of the content creator. As subscribers, consumers may contribute or donate money to a content creator on a recurring (e.g., weekly or monthly) basis or per piece of content created by the content creator. Content creators may interact with subscribers and/or prospective subscribers (e.g., consumers that show interest in the content created by content creators) in a variety of ways.

In a membership platform, monitoring for fraud is important. For example, content creators may create fraudulent accounts in order to scam subscribers out of money. Fake subscriber accounts may be made in order to fraudulently boost subscribership. Machine and/or human intervention may help mitigate issues of fraud. For example, machine learning and/or other machine intervention techniques may help assess and/or flag issues of fraud. Human agents may then review the flagged items to confirm or deny the fraudulent activity. In some instances, a result of an assessment may be that fraudulent activity was improperly flagged. However, absent stopping all fraud detection on that creator altogether, the activity may continue to be falsely flagged in the future, causing unnecessary work by fraud review agents.

In accordance with one or more implementations presented herein, a user interface (UI) for fraud review may provide access to various records, as well as the ability to assign immunities for fraud-related activity. Immunities may provide temporary holds on certain activity and/or information (e.g., conveyed in the records) that would otherwise continue to flag a content creator for fraud. Providing this and/or other functionality within a single UI allows for more efficient review.

Figure 1:
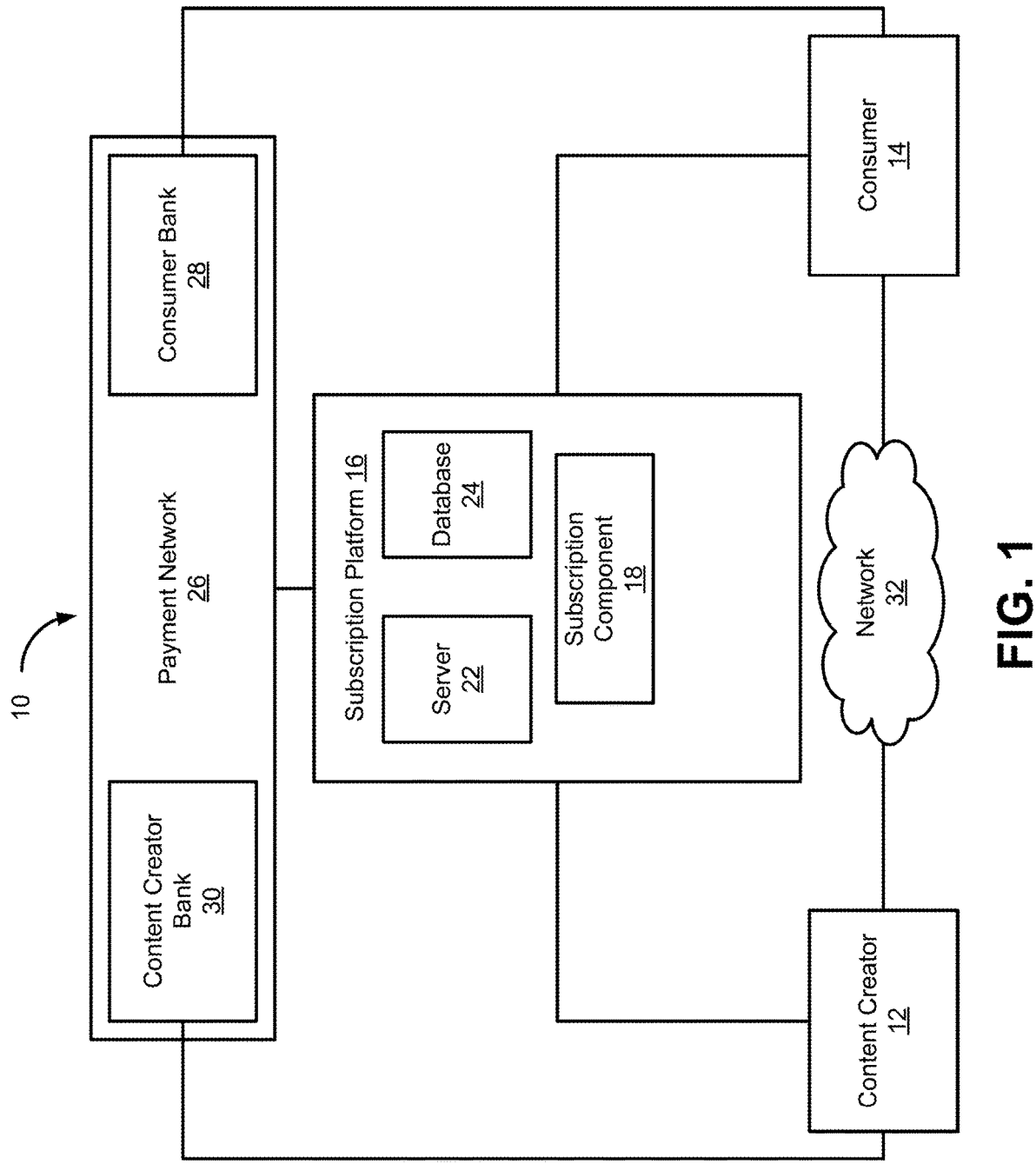
FIG. 1 illustrates an example membership system.

FIG. 1 illustrates an example subscriber-based membership system 10 (sometime referred to herein as a "membership platform"). A content creator 12 may register and set up a creator account with subscription platform 16. Content creator 12 may create a page on a website hosted by server 22 of subscription platform 16 and input relevant information. Content creator 12 may input information associated with and/or relevant to content creator 12 via subscription component 18, such as creation information, content information, information specifying desired and/or initial subscription levels, preferred revenue source information, and/or other information which will be discussed in greater detail herein. The page created by content creator 12 may be built using such information to make potential consumers aware of how content creator 12 may wish to be supported/receive support for his/her content creation in addition to subscribership revenue. Content creator 12 may set up a content creator account with subscription platform 16 through subscription component 18 or another appropriate component allowing content creator 12 to register with subscription platform 16. Various types of information regarding content creator 12 may be input into subscription platform 16, some of which may be information identifying content creator 12.

Consumer 14 (also referred to as a "subscriber") may set up a subscriber account with subscription platform 16. In setting up the subscriber account, consumer 14 may input demographic information relevant to consumer 14, e.g., age, income, job, etc. Information identifying consumer 14, such as a name, a picture, a phone number, etc. may be input by consumer 14 when setting up the subscriber account. Through the page created by content creator 12, a consumer 14 may pledge to donate a given amount of money to content creator 12 every time content creator 12 creates content. For example, if content creator 12 is an artist, consumer 14 may pledge to donate ten dollars each time content creator 12 creates a piece of art.

In order to remit payment to content creator 12, consumer 14 may set up a payment mechanism through subscription platform 16 as part of setting up his/her subscriber account. When subscription platform 16 is notified or determines that content creator 12 has created content, subscription platform 16 may access payment network 26 to obtain and transfer the pledged amount from consumer bank 28 to content creator bank 30. Alternatively (or in addition to per content pledge donations), consumer 14 may pledge to donate a given amount to content creator 12 on a recurring basis through subscription platform 16. For example, consumer 14 may pledge to donate five dollars each month to content creator 12, where each month, subscription platform 16 may access payment network 26 to obtain and transfer the pledged amount from consumer bank 28 to content creator bank 30. It should be understood that consumer 14 may have an established relationship with consumer bank 28, and that content creator 12 may have an established relationship with content creator bank 30. It should be noted that subscription platform 16 may retain a portion, such as some percentage, of the pledged amount, as a fee for hosting the page created by content creator 12, providing payment services, etc.

As consideration for the pledged donations, content creator 12 may provide some type of preferential access to consumer 14 in the form of, e.g., special perks or rewards. Content creator 12 can specify tiers of preferential access based upon the amount of money consumer 14 pledges to donate and/or depending on whether the pledged donation is a recurring donation or a per content donation. The amounts and/or types of pledged donations that can be made by consumer 14 to back content creator 12 can be referred to as subscription levels.

For example, in return for a monthly, recurring dollar amount of donation, content creator 12 may provide a high-resolution digital image of the artwork created during that month to consumer 14. In exchange for a weekly, recurring dollar amount of donation, content creator 12 may provide a high-resolution digital image of the artwork created during that month as well as a time-lapse video of content creator 12 creating the artwork. In exchange for another dollar amount per content donation, content creator 12 may provide a low-resolution digital image of the artwork. For another dollar amount per content donation, content creator 12 may engage in a live webchat or live meet-and-greet with consumer 14. Various types of preferential access may be provided by content creator 12 to consumer 14, and content creator 12 may specify the subscription level to preferential access correlation.

The preferential access may be provided to consumer 14 from content creator 12. For example, content creator 12 may email digital copies of artwork to consumer 14 over a communications network, such as a local area network (LAN), a wide area network (WAN), a wireless network (e.g., Wi-Fi) a mobile communication network, a satellite network, the Internet, fiber optic, coaxial cable, infrared, radio frequency (RF) or any other suitable network. The preferential access may be provided to consumer 14 from content creator 12 via subscriber platform 16. For example, the live webchat between content creator 12 and consumer 14 may be provided through some chat functionality of the page of content creator 12 hosted on server 22 of subscription platform 16, which may reside on communications network 32 or on another network (not shown).

It should be noted that not all subscription levels are necessarily associated with preferential access. Some consumers may be driven to subscribe to content creator 12 on the basis of created content rather than any special perks or rewards.

The specification and management of subscriptions on behalf of content creator 12 may be handled by subscription component 18 alone or in conjunction with database 24. For example, a user interface may be provided via subscription component 18 allowing content creator 12 to specify his/her desired subscription levels and corresponding preferential access, as well as his/her preferred sources of revenue. Subscription component 18 may receive the information input by content creator 12 and transmit the information for storage as one or more records, matrices, or other data structures in database 24 or within memory local to subscription component 18. Database 24 or the local memory of subscription component 18 may be configured in a suitable database configuration, such as a relational database, a structured query language (SQL) database, a distributed database, an object database, etc. Suitable configurations and database storage types will be apparent to persons having skill in the relevant art.

Content creator 12 may add subscribership information, update and/or delete existing subscribership information, add creation information, as well as update and/or delete creation information, add, update, and/or delete preferential access information and/or its correspondence to subscription levels, etc. Such changes may be input via subscription component 18 and reflected in its local memory and/or database 24. It should be understood that content creator 12 and/or consumer 14 may be an individual or some entity representative of an individual or group of individuals.

Apart from providing preferential access to consumer 14, content creator may engage with consumer 14 by interacting in a variety of ways. For example, content creator 12 may communicate with consumer 14 over email, one or more social media platforms, a messaging platform or other appropriate communication mechanisms or methods. It should be understood that such communication platforms or mechanisms may be embodied in communications network 32 allowing content creator 12 and consumer 14 to communicate outside of subscription platform 16. It should be understood that communication platforms or mechanisms may operate in conjunction with subscription platform 16 such that one or more of their respective functionalities may be utilized through subscription platform 16. For example, social media hyperlinks allowing information from content creator 12's page may be provided on the webpage allowing content creator 12 to share content creation progress updates with consumer 14. For example, content creator 12 may respond to a communication from consumer 14 posted on a comment section provided on content creator 12's page in a private message or as part of the comment thread. It should be noted that content creator 12 may engage a single consumer, e.g., consumer 14, one-on-one and/or may engage a group of consumers. For example, content creator 12 may post a "public" comment on his/her webpage that may be seen by any consumer that is a subscriber to content creator 12 and/or any consumer that may be a potential subscriber.

Figure 2:
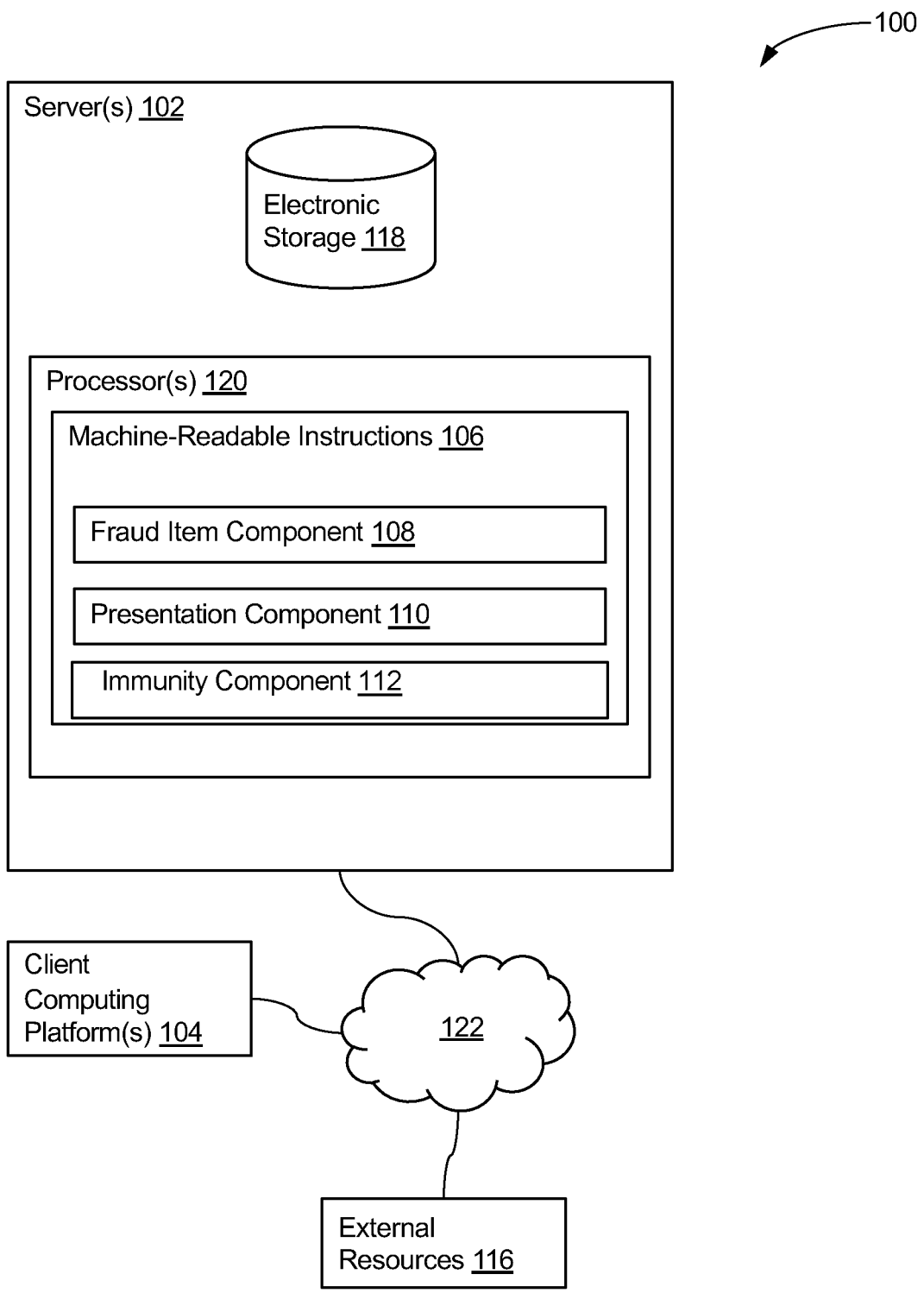
FIG. 2 illustrates a system configured to facilitate resolution of work items within a fraud resolution workflow, in accordance with one or more implementations.

FIG. 2 illustrates a system 100 configured to facilitate resolution of work items within a fraud resolution workflow, in accordance with one or more implementations. In some implementations, system 100 may include one or more of server(s) 102, client computing platform(s) 104, and/or other components. Server(s) 102 may be configured to communicate with one or more client computing platforms 104 according to a client/server architecture and/or other architectures via one or more network(s) 122. The terms client computing platform, remote computing platform, and/or computing platform may be used interchangeably herein to refer to individual ones of the client computing platform(s) 104. In some implementations, one or more network(s) 122 may include the Internet and/or other networks. Client computing platform(s) 104 may be configured to communicate with other client computing platforms via server(s) 102 and/or according to a peer-to-peer architecture, a client-server architecture, and/or other architectures. Users may access system 100 via client computing platform(s) 104.

It is noted the system 100 of FIG. 2 may be the same as, or included as part of, the system 10 shown in FIG. 1. For example, the server(s) 102 may be the same as or included in servers 22. Network(s) 122 may be the same as or included in network 32. Individual client computing platforms of one or more client computing platforms 104 may be computing platforms utilized by content creator 12 and/or consumer 14 to access system 10 and/or system 100. Non-transitory electronic storage 118 may be the same as or included in database 24. Accordingly, those skilled in the art will recognize that although system 10 and system 100 are shown and described separately, they may comprise a single common system. However, in some implementations, the features and/or functionality of system 100 may be provided remotely as a separate system from system 10.

In FIG. 2, server(s) 102 may include one or more processors 120 configured by machine-readable instructions 106. Machine-readable instructions 106 may include one or more instruction components. Executing the machine-readable instructions 106 may cause the one or more processor(s) 120 to facilitate resolution of work items within a fraud resolution workflow. The instruction components may include one or more of a fraud item component 108, a presentation component 110, an immunity component 112, and/or other instruction components.

Fraud item component 108 may be configured to manage fraud workflow information and/or other information. The fraud workflow information may specify a queue of work items. Individual work items may represent individual fraud resolution tasks. The individual work items may be associated with one or more individual content creators, subscribers, and/or other users of a membership platform flagged for fraud. The content creators may offer benefit items to the subscribers in exchange for consideration. An individual work item may represent an indication of suspicious and/or fraudulent activity by an individual subscriber and/or individual content creator. Individual work items may be associated with one or more work items records. Managing may include obtaining, storing, monitoring, updating, deleting, and/or other activity.

The queue of work items may represent a repository or record of work items (flagged as fraud and ready for resolution or not). The fraud item component 108 may be configured to generate a common queue of work items. The common queue of work items may include a set of work items from the queue that are available for resolution by users. The common queue may be organized based on the temporal order of the work items. The temporal order may be indicative of a timeline in which the items were flagged and made ready for resolution. In some implementations, the common queue may be organized based on priority as set by a system administrator, and/or by other organization methods.

In some implementations, the fraud item component 108 may be configured to generate individual user-specific queues of work items of the individual users. User-specific queues may include individual exclusive subsets of work items from the queue. Populating the individual user-specific queues with the individual exclusive subsets of work items from the queue may cause the work items to be removed from the common queue and added to the corresponding user-specific queue.

In some implementations, an individual user-specific queue may be displayed as one or more of a list, a grid, and/or other display arrangements. A grid may include one or more of a set of attribute-named columns, a set of rows, individual cells at intersections of individual attribute-named columns and individual rows, and/or other content. An individual attribute-named column may represent an individual attribute. An individual row may represent an individual work item. The individual cells may include individual attribute values of the individual attributes represented in the attribute-named columns. The rows may be ordered based on a temporal order of the work items and/or may be rearrangeable by the individual users. In some implementations, the common queue may be similarly arranged for presentation and/or may include more or less information than the individual user-specific queues.

In some implementations, the individual user-specific queues may be organized based on temporal order of the work items as they were in the queue. In some implementations, users may rearrange the order of the work items in the individual user-specific queues. This may allow the user to prioritize within their user-specific queue as they see fit.

In some implementations, a user interface presenting a user-specific queue may be configured to obtain user entry and/or selection of the individual work items in the user-specific queue. Responsive to the entry and/or selection of an individual work item, the user interface may display an individual work item page for the individual work item. The individual work item pages may provide an interface through which the users may access individual work items for resolution. Resolution may include providing one or more of a fraud indication, a non-fraud indication, one or more restrictions (see, e.g., immunity component 112), and/or other indications. A non-fraud indication for a given work item may cause the given work item to be removed from the queue. A fraud indication may escalate a work item for further review and/or perform one or more automated actions. An automated action may include one or more of freezing accounts of a content creator, disabling a creator page, and/or other actions.

A user interface displaying individual work item pages may provide access to individual work item records of the individual work items. The work item records may include one or more of a creator page record, a creator profile record, a subscriber record, a fraud activity record, a system record, and/or other records.

The creator page record may include page information defining creator pages of the content creators and/or other information. The page may be built using information to make potential subscribers aware of how a content creator may wish to be supported/receive support for his/her content creation in addition to subscribership revenue. The page may facilitate access to content by current subscribers. A creator page record may facilitate a "view as" functionality where fraud agents may review a creator page as if viewing from the perspective of a subscriber or potential subscriber.

The creator profile record may include creator profile information and/or other information. The creator profile information may include values of creator attributes. The creator attributes may characterize aspects of the content creators and/or content created by the content creators. The creator attributes may include one or more of an identification attribute, a creation attribute, a creator activity attribute, and/or other attributes. A value of an identification attribute may identify a content creator. A content creator may be identified by one or more of a name, a username, an email, a phone number, and/or other identifying information. A value of a creation attribute may describe one or more characteristics of the content created and/or offered within the membership platform. One or more characteristics of the content created and/or offered may include one or more of quantity of subscribers to content, consideration received from individual subscribers, total consideration received, average consideration received, content types of their content, the most significant consideration received by an individual subscriber, age appropriateness (e.g., is it 18+), length of time they have been a content creator in the membership platform, an indication of when and/or how many times the individual content creator was reviewed for fraud, and/or other information. A value of a creator activity attribute may describe the activity history of a content creator within the membership platform. The activity history may include a timeline and/or time-stamped record of activity by the content creator within the membership platform. Activity may include page views, clicks, and/or other behaviors on the membership platform.

The subscriber record may include subscriber information and/or other information. The subscriber information may include values of subscriber attributes. The subscriber attributes may characterize aspects of the subscribers to the content creators. The subscriber attributes may include one or more of an identification attribute, a subscription attribute, a subscriber activity attribute, and/or other attributes. A value of an identification attribute may identify a subscriber. A subscriber may be identified by one or more of a name, a username, an email, a phone number, and/or other identifying information. A value of a subscription attribute may describe one or more characteristics of a subscriber's subscribership in the membership platform. One or more characteristics of a subscriber's subscribership may include one or more of quantity of subscriptions, consideration paid to individual subscribers, total consideration paid, average consideration paid, content types of interest, length of time they have been a subscriber in the membership platform, an indication of when and/or how many times the individual subscriber was reviewed for fraud, and/or other information. A value of a subscriber activity attribute may describe the activity history of a subscriber within the membership platform. The activity history may include a timeline and/or time-stamped record of activity by the subscriber within the membership platform. The activity history may be determined for activity on individual creator pages. Activity may include page views, clicks, and/or other behaviors on the membership platform.

The fraud activity record may include fraud activity information characterizing user activity with or relating to the creator pages of the content creators. The fraud activity information may include values of one or more fraud activity attributes. The one or more fraud activity attributes may describe fraudulent activity at issue which led to the creation of a work item. The one or more fraud activity attributes may include one or more of a qualitative attribute, a quantitative attribute, and/or other attributes. A value of a qualitative attribute may include one or more of a description of what the creator and/or subscriber has been flagged for, an explanation of the why and what caused the flagging, and/or other information. By way of non-limiting illustration, a value of a qualitative attribute may describe one or more of payments (e.g., quantity and/or rate of), subscriber and/or creator activity histories, chargebacks (e.g., quantity and/or rate of), information about collaborators, and/or other information which may have led to a flagging for fraud. By way of non-limiting illustration, a content creator may be flagged for fraud if a rate of chargebacks meets and/or exceeds a threshold. By way of non-limiting illustration, a content creator may be flagged for fraud if a collaborator has been flagged for fraud. A value of a quantitative attribute may include a numerical representation of fraud risk (e.g., a level of fraud, 1-10) and/or other information. One or more values of one or more of fraud activity attributes may be derived from machine learning and/or other techniques.

The system record may include system log information characterizing execution of software providing the membership platform. The system log information characterizing execution of software providing the membership platform may include a log file and/or other information. A log file may comprise a record of one or more of events that occur in the software. The events may include events taking place in the execution of the software in order to provide an audit trail that can be used to understand the activity of the software and to diagnose problems.

Presentation component 112 may be configured to effectuate presentation of a user interface on individual computing platforms associated with individual users. The user interface may be configured to display one or more of individual user-specific queues for an individual user, individual work item pages, and/or other content.

In some implementations, presentation component 110 may be configured to effectuate presentation of a user interface for displaying individual work item pages through which the users may access the individual work items for resolution. The user interface may facilitate access to individual ones of work item records of the individual work items associated with the individual work item pages. In some implementations, individual user-specific queues and/or versions thereof (e.g., compacted versions) may be presented alongside the work item pages so that user access to other work items (and their respective work item pages) may be accomplished via a single UI.

An instance of a user interface may include one or more user interface elements configured to facilitate user interaction with the user interface. By way of non-limiting illustration, user interface elements may include one or more of text input fields, drop down menus, check boxes, display windows, virtual buttons, and/or other elements configured to facilitate user interaction.

In some implementations, the user interface may include one or more user interface elements configured to facilitate individualized access to individual ones of the work item records. By way of non-limiting illustration, access to individual ones of the work item records may be accomplished through entry and/or selection of user interface elements which toggle between display views of the information described in the individual work item records. In some implementations, a display view of information described in an individual work item record may include one or more of a grid view of the information, a tabular view of the information, a list view of the information, a spreadsheet view, and/or other display arrangement which a user may view the information described in a work item record.

In some implementations, presentation component 110 may be configured to obtain user input via the user interface specifying the resolution of the fraud for the individual work items. The resolution may include a fraud indication, a non-fraud indication, one or more immunities, and/or other indications. In some implementations, resolution may be provided by entry and/or selection of one or more user interface elements.

In some implementations, presentation component 110 may be configured to obtain user input specifying immunity information and/or other information. The immunity information may define one or more restrictions placed on the individual work items for future flagging for the fraud. As a result, the immunity information may define a restriction placed on a given work item resolved with the non-fraud indication. The restriction may restrict the given work item from being flagged for the fraud in the future.

The one or more restrictions may specify information included in one or more of the work items records which may not cause the individual work items to be flagged for fraud. The one or more restrictions may include restriction criteria. The restriction criteria may dictate one or more of a length of time specified information may not cause the individual work items to be flagged for fraud, a quantity of occurrences of the specified information within the work item record not causing the individual work items to be flagged for fraud, and/or other restriction criteria related to the information included in one or more of the work items records not causing the individual work items to be flagged for fraud.

By way of non-limiting illustration, a restriction may specify that a rate of chargebacks by a given content creator meeting and/or exceeding a threshold as defined in a fraud activity record may not cause the content creator to be flagged for fraud. Restriction criteria on this restriction may include one or more of a length of time this restriction is in place, a quantity of occurrence of the rate meeting and/or exceeding the threshold before the restriction is removed, and/or other criteria.

In some implementations, immunity component 112 may be configured to manage the immunity information. Managing may include storing, monitoring, updating, deleting, and/or other activity. The immunity component 112 may be configured to monitor the immunity information to determine whether individual restrictions are overused or underused. In some implementations, monitoring may be on a system-wide basis, a team basis (e.g., a group of agents), an agent basis, and/or other bases.

In some implementations, overuse may be based on an upper threshold. The upper threshold may include one or more of a quantity of use of a given restriction, a frequency of use of a given restriction, and/or other consideration. In some implementations, the upper threshold may be specified on a system-wide basis, a team basis (e.g., a group of agents), an agent basis, and/or other bases.

In some implementations, underuse may be based on a lower threshold. The lower threshold may include one or more of a quantity of use of a given restriction, a frequency of use of a given restriction, and/or other consideration. In some implementations, the lower threshold may be specified on a system-wide basis, a team basis (e.g., a group of agents), an agent basis, and/or other bases.

In some implementations, the immunity component 112 may be configured to generate and/or distribute notifications to system administrators based on the immunity information and/or other information. By way of non-limiting illustration, a notification may include an indication that a given restriction is being overused and/or underused on a system-wide basis, a team basis (e.g., a group of agents), an agent basis, and/or other bases.

Figure 5:
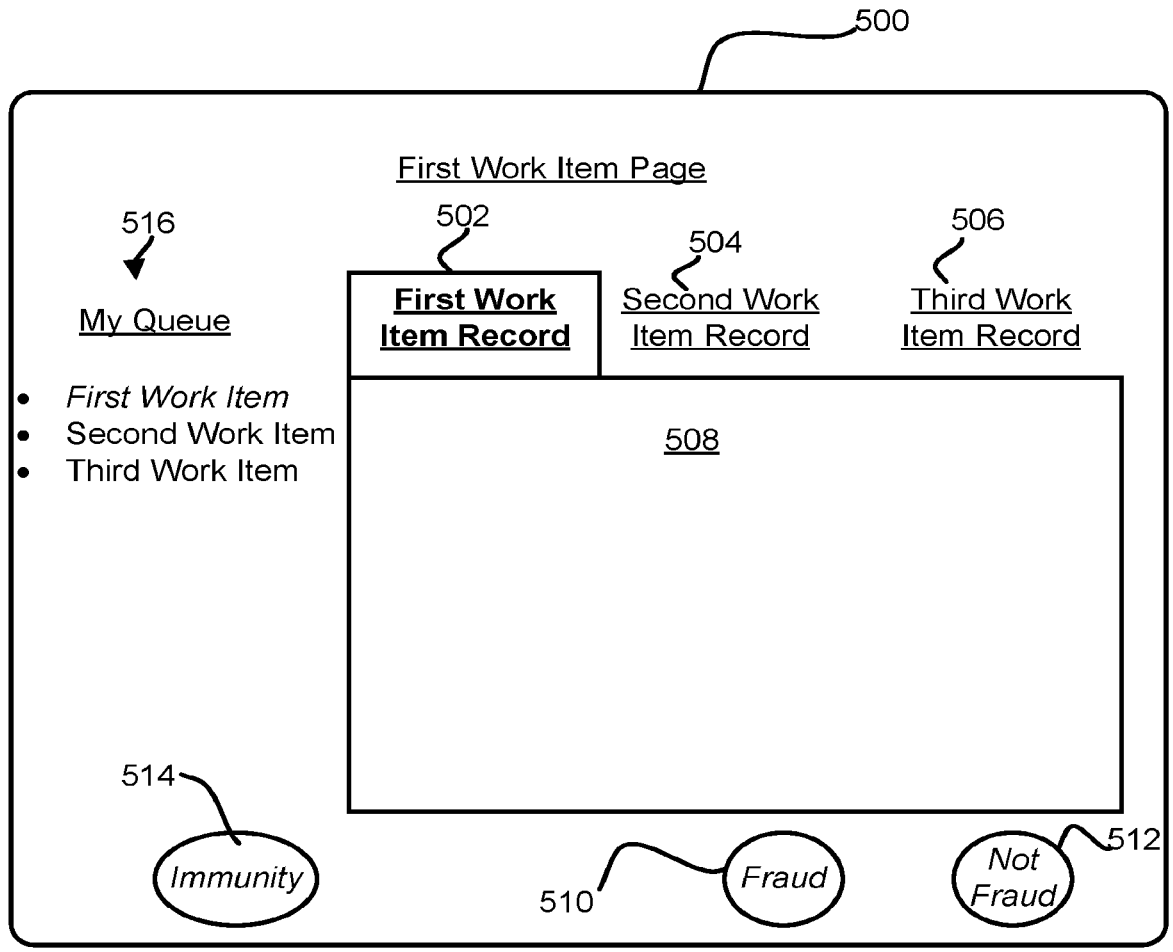
FIG. 5 illustrates a user interface, in accordance with one or more implementations.

FIG. 5 illustrates a work item page 500 of a work item, as it may appear on a user interface, in accordance with one or more implementations. The user interface may facilitate access to individual work item records of the work item. By way of non-limiting illustration, the work item records may include one or more of a first work item record, a second work item record, a third work item record, and/or other work item records. The user interface includes user interface elements configured to facilitate individualized access to individual ones of the work item records. By way of non-limiting illustration, the user interface may include one or more of a first user interface element 502 to access the first work item record, a second user interface element 504 to access the second work item record, a third user interface element 506 to access the third work item record, and/or other user interface elements. Access to individual work item records may be accomplished through entry and/or selection of the user interface elements which toggle between display views of the information described in the individual work item records. By way of non-limiting illustration, as shown in FIG. 5, a selection of the first user interface element 502 shows a first display view 508 for presenting information included in the first work item record. By way of non-limiting illustration, in FIG. 6, selection of the second user interface element 504 shows a second display view 602 for presenting information included in the second work item record.

Figure 6:
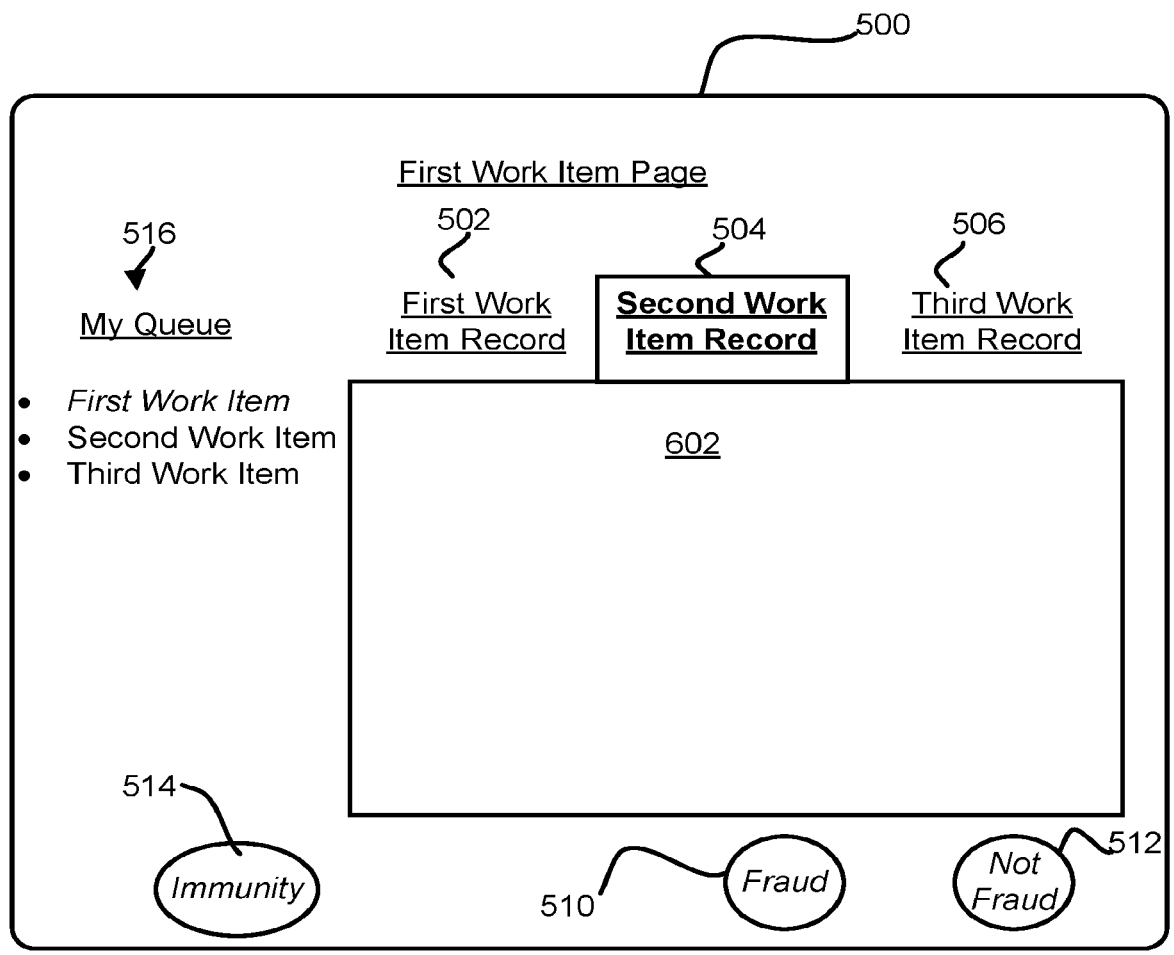
FIG. 6 illustrates a user interface, in accordance with one or more implementations.

In FIG. 5 and FIG. 6, in some implementations, the work item page 500 may display a user-specific queue 516. The user-specific queue 516 may include a listed set of work items. In some implementations, individual work items in the list may be selectable to generate individual work item pages for the selected ones of the individual work items. The user interface may be configured to obtain user entry and/or selection to resolve the indication of fraud for the work item. By way of non-limiting illustration, a user interface element 510 may be provided to input a fraud indication, and user interface element 512 may be provided to input a non-fraud indication. Further, a user interface element 514 may be provided to specify immunity information and/or other information.

Figure 7:
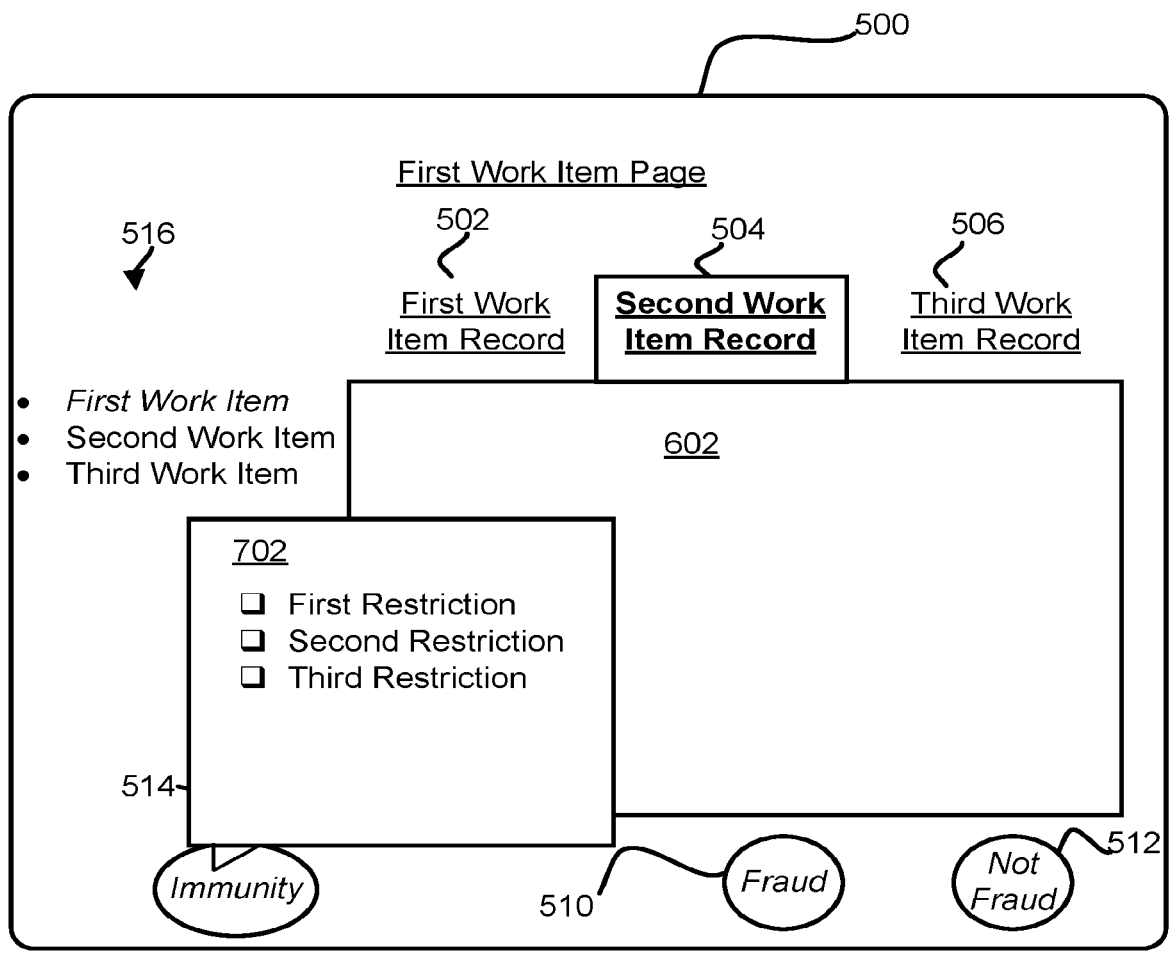
FIG. 7 illustrates a user interface, in accordance with one or more implementations.

FIG. 7 shows the work item page 500 configured to obtain user input specifying immunity information. By way of non-limiting illustration, responsive to selecting user interface element 514, a display window 702 may be generated which may display options for restrictions. In some implementations, the restrictions may be presented in a list accompanying by check boxes and/or other user interface elements to facilitate user interaction with the display window 702.

Returning to FIG. 2, in some implementations, server(s) 102, client computing platform(s) 104, and/or external resources 116 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 116 may be operatively linked via some other communication media.

A given client computing platform 104 may include one or more processors configured to execute computer program components. The computer program components may be configured to enable an expert or user associated with the given client computing platform 104 to interface with system 100 and/or external resources 116, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a smartphone, a gaming console, and/or other computing platforms.

External resources 116 may include sources of information outside of system 100, external entities participating with system 100, and/or other resources. In some implementations, some or all of the functionality attributed herein to external resources 116 may be provided by resources included in system 100.

Server(s) 102 may include electronic storage 118, one or more processors 120, and/or other components. Server(s) 102 may include communication lines, or ports to enable the exchange of information with a network and/or other computing platforms. Illustration of server(s) 102 in FIG. 2 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may comprise non-transitory storage media that electronically stores information. The electronic storage media of electronic storage 118 may include one or both of system storage that is provided integrally (i.e., substantially non-removable) with server(s) 102 and/or removable storage that is removably communicable with server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from client computing platform(s) 104, and/or other information that enables server(s) 102 to function as described herein.

Processor(s) 120 may be configured to provide information processing capabilities in server(s) 102. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 2 as a single entity, this is for illustrative purposes only. In some implementations, processor(s) 120 may include a plurality of processing units. These processing units may be physically located within the same device, or processor(s) 120 may represent processing functionality of a plurality of devices operating in coordination. Processor(s) 120 may be configured to execute components 108 and/or 110, and/or other components. Processor(s) 120 may be configured to execute components 108 and/or 110, and/or other components by software; hardware; firmware; some combination of software, hardware, and/or firmware; and/or other mechanisms for configuring processing capabilities on processor(s) 120. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108 and/or 110 are illustrated in FIG. 2 as being implemented within a single processing unit, in implementations in which processor(s) 120 includes multiple processing units, one or more of components 108 and/or 110 may be implemented remotely from the other components. The description of the functionality provided by the different components 108 and/or 110 described below is for illustrative purposes, and is not intended to be limiting, as any of components 108 and/or 110 may provide more or less functionality than is described. For example, one or more of components 108 and/or 110 may be eliminated, and some or all of its functionality may be provided by other ones of components 108 and/or 110. As another example, processor(s) 120 may be configured to execute one or more additional components that may perform some or all of the functionality attributed below to one of components 108 and/or 110.

Figure 3:
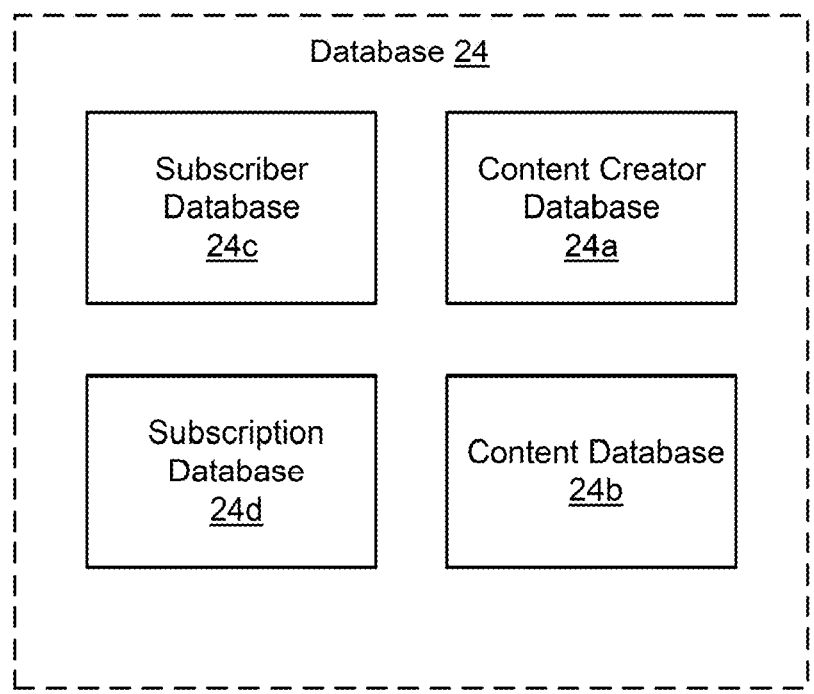
FIG. 3 illustrates an example database.

FIG. 3 illustrates elements that may make up database 24. As indicated previously, subscription component 18 may transmit information input by content creator 12 and/or consumer 14 regarding creation and/or subscribership information to database 24. Subscription platform 16, via server 22, for example, may monitor and obtain creation and/or subscribership information for storage in database 24. For example, subscription platform 16 may monitor and store additional content creator and/or subscriber demographic information as well as performance-related subscribership information, e.g., engagement activity between content creator 12 and his/her subscribers, one of whom may be consumer 14. For example, subscription platform 16 may monitor the amount of money being generated and/or lost through the subscribers, as well as content creator 12's subscriber retention rate. For example, subscription platform 16 may monitor and store performance-related creation information, such as the amount of content that content creator 12 is creating, how often and/or how quickly content creator 12 reacts to subscriber engagement activity, etc.

Database 24 may include one or more databases or partitions in which information relating to content creator 12, and/or subscribership relevant to content creator 12. For example, database 24 may include a content creator database 24a, a content database 24b, a subscriber database 24c, and a subscription database 24d. It should be noted that the elements and/or functionality of database 24 may be implemented in local memory resident in subscription component 18 or shared between database 24 and the local memory of subscription component 18 rather than solely in database 24.

Database 24 may be populated with creation data and/or subscription level information monitored or obtained from and/or associated with existing content creator and/or subscriber accounts established in subscription platform 16. Creation data can refer to information that characterizes one or more of content creator 12, the content that content creator 12 creates, and activity engaged in by content creator 12 to interact with one or more subscribers and/or to which consumer 14 is granted preferential access.

Content creator information characterizing content creator 12 can be information reflecting the type of creator that content creator 12 designates him/herself to be and/or any preferences regarding subscription offerings by content creator 12. For example, content creator type information can reflect that content creator 12 may be a paint artist, a digital artist, a sculptor, a video game developer, a writer, a performance artist, etc. Content creator preference information can reflect subscription levels content creator 12 wishes to offer to subscribers. Content creator preference information can reflect, e.g., a desired minimum revenue, preferred sources of revenue, subscription level proportions, etc. For example, content creator preference information may include information indicating content creator 12's desire for more subscribers pledging some amount of money or less subscribers pledging a greater amount of money. For example, content creator preference information may include information specifying that content creator 12 wishes to supplement his/her subscription-generated revenue with revenue generated from the sale of promotional merchandise. Such information may be stored in a content creator database 24a.

In addition to content creation-related information, and upon registering with subscription platform 16 as a content creator, content creator 12 may input information characterizing the identity of content creator 12. For example, content creator 12 may input or upload contact information, a telephone number associated with a personal user device (e.g., a phone, a smartphone, etc.) an email address, a photograph, and/or other identifying information. Such identifying information can be used by subscription platform 16 in a variety of ways to associate content creator 12 with particular content, his/her page, payment of subscription donations, etc. For example, content creator 12's photograph may be used, e.g., as an avatar on content creators page, and/or as a mechanism for correlating content creator 12's attendance at a live event with content creator 12's status as a content creator. Subscription component 18 or another component may be used to provide a user interface that can be used by the content creator to input such information.

Content information characterizing the content that content creator 12 creates can refer to one or more of the type of content created, the medium in which the content is created and/or presented, the amount of content created, and/or the frequency at which the content is created. For example, the type of content information and/or content medium information may indicate that content creator 12 creates paintings on canvas, develops video games for a mobile platform, performs in online musical performances, etc. For example, content amount information can reflect that content creator 12 created a series of artwork comprising four paintings. For example, content frequency information can indicate that content creator 12 developed three video games over the course of six months. Such information may be stored in content database 24b.

As previously discussed, consumer 14 may subscribe to content creator 12 by registering with subscription platform 16. During registration, consumer 14 may input certain subscriber demographic information indicative of economic and/or social characteristics of consumer 14. Subscriber demographic information may reflect the yearly income of consumer 14, a geographic area in which consumer 14 resides, the age of consumer 14, interests of consumer 14, etc. Subscriber information can include data regarding the amount of money consumer 14 is currently pledged to donate to one or more content creators. Over time, as monitored and collected by subscription platform 16, subscriber information can include information regarding the amount of money consumer 14 has previously donated to one or more content creators, including content creator 12. Subscriber information, as monitored and obtained by subscription platform 16 may include an Internet Protocol (IP) address indicative of a current location of consumer 14 and/or an IP address indicating a payment source. Such information may be stored in subscriber database 24c.

Like content creator 12, consumer 14 may input or upload other identifying information that can be used by subscription platform 16 in a variety of ways to associate consumer 14 with particular content, a particular content creator, payment of subscription donations, etc. For example, a photograph or phone number of consumer 14 may be used, e.g., as a mechanism for correlating consumer 14's attendance at a live event with consumer 14's status as a subscriber of content creator 12, another content creator present at the live event, a subscriber of content similar to that being presented at the live event, etc. Such information may be stored in subscriber database 24c. Subscription component 18 or another component may be used to provide a user interface that can be used by consumer 14 to input such information.

Subscription level information can refer to information characterizing different subscription levels and corresponding preferential access information specified by content creator 12. For example, subscription level information can reflect that a ten dollar recurring donation is rewarded with a high-resolution digital image of artwork created during that month to consumer 14. Such subscriber level information may be stored in subscription database 24d.

It should be noted that other databases or partitions may make up database 24. For example, database 24 may include one or more databases or partitions for storing information including, but not limited to the following: preferential access information characterizing activity in which content creator 12 engages can refer to data reflecting the type of activity, the level and/or exclusivity of preferential access to that activity granted to consumer 14; subscriber and/or content creator engagement information characterizing interactions, the type and/or frequency of interactions between subscribers and content creators, and/or the medium over which interactions can occur; and historical subscription levels and/or engagement information reflecting subscription levels and/or engagement information monitored and gathered over one or more periods of time.

It should be noted that some of the information described above may not be necessarily required. It should be noted that information reflecting additional aspects of, e.g., the content, content creator, content creator preferences, and/or subscribership is contemplated by the disclosure. For example, preferential access need not necessarily be offered for each subscription level. For example, subscriber data may include data reflecting particular content creators to which a subscriber pledges donations.

Figure 4:
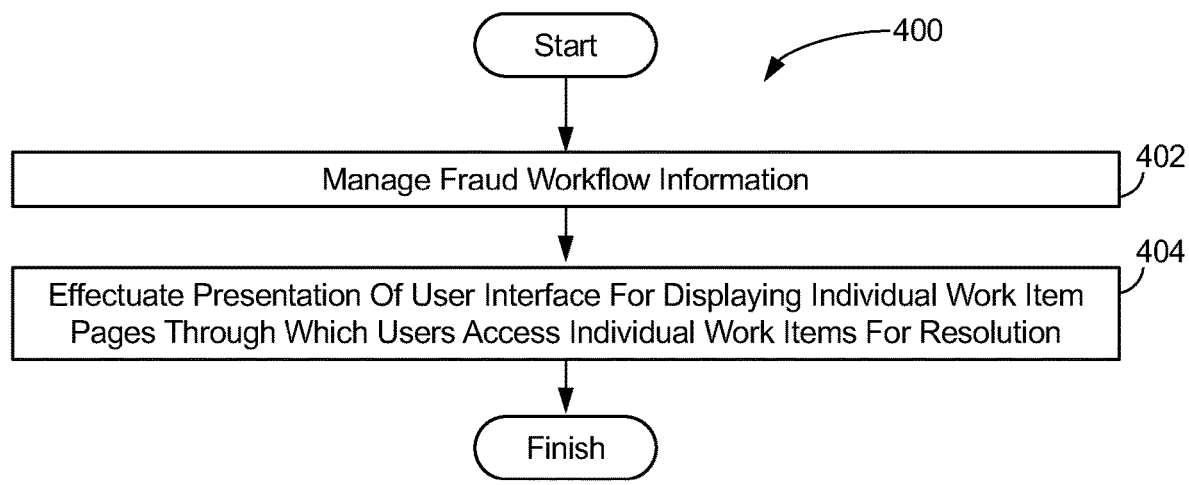
FIG. 4 illustrates a method to facilitate resolution of work items within a fraud resolution workflow, in accordance with one or more implementations.

FIG. 4 illustrates a method 400 to facilitate resolution of work items within a fraud resolution workflow, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

An operation 402 may include manage fraud workflow information. Operation 402 may be performed by one or more hardware processors configured by machine-readable instructions including a component that is the same as or similar to fraud item component 108, in accordance with one or more implementations.

An operation 404 may include effectuating presentation of a user interface for displaying individual work item pages through which the users access the individual work items for resolution. The user interface facilitates access to individual ones of the work item records of the individual work items associated with the individual work item pages. Operation 404 may be performed by one or more hardware processors configured by machine-readable instructions including a component that is the same as or similar to presentation component 110, in accordance with one or more implementations.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A method to characterize use of a user interface through which work items are accessed, the method being implemented in a computer system comprising non-transitory electronic storage storing machine-readable instructions, and one or more physical processors, the method comprising:

effectuating presentation of a user interface on a computing platform associated with a user, the user interface being configured to display a work item page, the work item page being associated with a work item record, the work item record describing a fraud resolution task associated with a content creator of a membership platform flagged for fraud, wherein the work item page of the user interface facilitates access to the work item record;

obtaining user input information conveying user input into the user interface via the computing platform, the user input information specifying a resolution of the fraud associated with the fraud resolution task and immunity information, wherein the resolution is specified as a fraud indication or a non-fraud indication, wherein the non-fraud indication causes the fraud resolution task to be removed from a queue of fraud resolution tasks, and wherein the immunity information defines a restriction placed on the content creator for future flagging for the fraud;

monitoring the user input into the user interface to determine a number of times the user provides the user input that defines the restriction placed on the content creator;

comparing the number of times the user provides the user input that defines the restriction to one or more thresholds to determine whether the restriction is being overused or underused by the user, such that when the number of times the user provides the user input that defines the restriction exceeds the one or more thresholds, a determination of overuse is made, and when the number of times the user provides the user input that defines the restriction does not exceed the one or more thresholds, a determination of underuse is made; and in response to determining the overuse or the underuse of the restriction by the user, generating a notification and distributing the notification to the computing platform of the user and/or one or more other computing platforms of one or more other users, the notification including an indication that the restriction is being overused or underused by the user.

2. The method of claim 1, further comprising:
managing fraud workflow information, the fraud workflow information defining the queue of fraud resolution tasks.

3. The method of claim 2, wherein the queue of fraud resolution tasks is accessible to the user and the one or more other users.

4. The method of claim 1, wherein the restriction defines which information in the work item record will not cause the content creator to be flagged for the fraud in the future.

5. The method of claim 4, wherein the restriction includes restriction criteria dictating a length of time the information is allowed to be in the work item record and not cause the content creator to be flagged for the fraud.

6. The method of claim 4, wherein the restriction includes restriction criteria dictating a quantity of occurrences of presence of the information in the work item record that is allowed until the content creator is flagged for the fraud.

7. The method of claim 1, wherein the work item record is associated with a creator page record, a creator profile record, a subscriber record, a fraud activity record, and a system record.

8. The method of claim 7, wherein the user interface includes user interface elements configured to facilitate individualized access to individual ones of the creator page record, the creator profile record, the subscriber record, the fraud activity record, and the system record.

9. The method of claim 8, wherein:
the creator page record includes page information defining a creator page of the content creators;
the creator profile record includes creator profile information, the creator profile information including values of creator attributes, the creator attributes characterizing aspects of the content creator and/or content created by the content creator;
the subscriber record includes subscriber information, the subscriber information including values of subscriber attributes, the subscriber attributes characterizing aspects of subscribers to the content creator;
the fraud activity record includes activity information characterizing creator activity with, or relating to, the creator page of the content creator; and
the system record includes system log information characterizing execution of software providing the membership platform.

10. The method of claim 1, wherein the user interface displays a user-specific queue of work items specifically associated with the user.

11. A system configured to characterize use of a user interface through which work items are accessed, the system comprising:

one or more physical processors configured by machine-readable instructions to:
effectuate presentation of a user interface on a computing platform associated with a user, the user interface being configured to display a work item page, the work item page being associated with a work item record, the work item record describing a fraud resolution task associated with a content creator of a membership platform flagged for fraud, wherein the work item page of the user interface facilitates access to the work item record;
obtain user input information conveying user input into the user interface via the computing platform, the user input information specifying a resolution of the fraud associated with the fraud resolution task and immunity information, wherein the resolution is specified as a fraud indication or a non-fraud indication, wherein the non-fraud indication causes the fraud resolution task to be removed from a queue of fraud resolution tasks, and wherein the immunity information defines a restriction placed on the content creator for future flagging for the fraud;
monitor the user input into the user interface to determine a number of times the user provides the user input that defines the restriction placed on the content creator;
compare the number of times the user provides the user input that defines the restriction to one or more thresholds to determine whether the restriction is being overused or underused by the user, such that when the number of times the user provides the user input that defines the restriction exceeds the one or more thresholds, a determination of overuse is made, and when the number of times the user provides the user input that defines the restriction does not exceed the one or more thresholds, a determination of underuse is made; and in response to determining the overuse or the underuse of the restriction the user, generate a notification and distribute the notification to the computing platform of the user and/or one or more other computing platforms of one or more other users, the notification including an indication that the restriction is being overused or underused by the user.

12. The system of claim 11, wherein the one or more physical processors are configured by the machine-readable instructions to:
manage fraud workflow information, the fraud workflow information defining the queue of fraud resolution tasks.

13. The system of claim 12, wherein the queue of fraud resolution tasks is accessible to the user and the one or more other users.

14. The system of claim 11, wherein the restriction defines which information in the work item record will not cause the content creator to be flagged for the fraud in the future.

15. The system of claim 14, wherein the restriction includes restriction criteria dictating a length of time the information is allowed to be in the work item record and not cause the content creator to be flagged for the fraud.

16. The system of claim 14, wherein the restriction includes restriction criteria dictating a quantity of occurrences of presence of the information in the work item record that is allowed until the content creator is flagged for the fraud.

17. The system of claim 11, wherein the work item record is associated with a creator page record, a creator profile record, a subscriber record, a fraud activity record, and a system record.

18. The system of claim 17, wherein the user interface includes user interface elements configured to facilitate individualized access to individual ones of the creator page record, the creator profile record, the subscriber record, the fraud activity record, and the system record.

19. The system of claim 18, wherein:
the creator page record includes page information defining a creator page of the content creators;
the creator profile record includes creator profile information, the creator profile information including values of creator attributes, the creator attributes characterizing aspects of the content creator and/or content created by the content creator;
the subscriber record includes subscriber information, the subscriber information including values of subscriber attributes, the subscriber attributes characterizing aspects of subscribers to the content creator;
the fraud activity record includes activity information characterizing creator activity with, or relating to, the creator page of the content creator; and
the system record includes system log information characterizing execution of software providing the membership platform.

20. The system of claim 11, wherein the user interface displays a user-specific queue of work items specifically associated with the user.

* * * * *